July 14, 1959  G. P. KUNKEL ET AL  2,894,263
FLOODING CONTROL DEVICE FOR TOILET COMMODES
Filed July 25, 1958  2 Sheets-Sheet 1

Gerhardt P. Kunkel
Fred K. Koeppel
INVENTORS

BY *Lawrence A. O'Brien*
*and Harvey B. Jacobson*
Attorneys

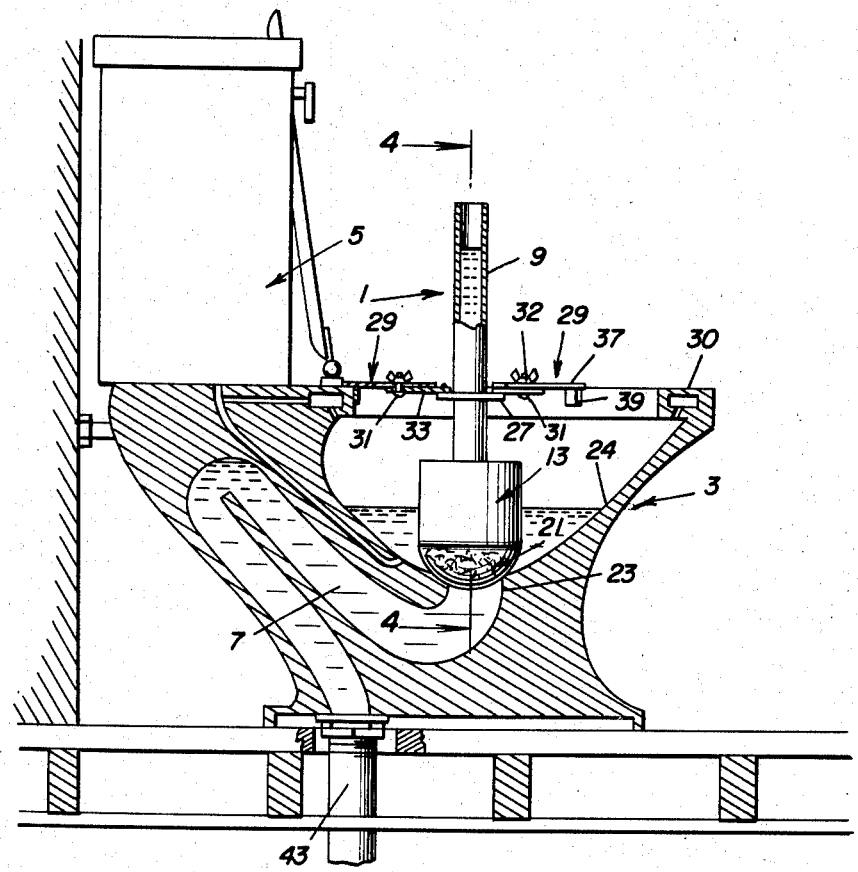
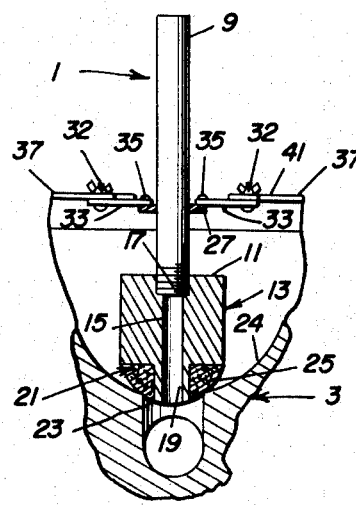
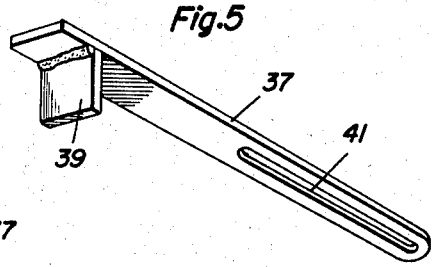
Fig.3
Fig.4
Fig.5
Gerhardt P. Kunkel
Fred K. Koeppel
INVENTORS United States Patent Office 2,894,263
Patented July 14, 1959

2,894,263

FLOODING CONTROL DEVICE FOR TOILET COMMODES

Gerhardt P. Kunkel, Bellwood, and Fred K. Koeppel, Forest Park, Ill.

Application July 25, 1958, Serial No. 750,968

1 Claim. (Cl. 4—1)

This invention relates to improvements in devices for preventing flooding and overflowing of toilet commodes resulting from backflow from sewers.

As is well known, basement toilet commodes, because of heavy rains, and other causes, frequently overflow and flood the basement as a result of back flow of sewage into the commode from the sewer.

The primary object of this invention is to provide a device adapted for installation in a toilet commode to close the sewage discharge from the commode to the sewer, whereby to prevent the commode from overflowing when sewage backs up to the commode, and which is of simple, inexpensive construction and adapted for easy, quick installation in the commode without the use of tools such as wrenches, and will not crack the commode.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is an enlarged view in vertical section taken on the line 3—3 of Figure 1;

Figure 4 is a fragmentary view in vertical section taken on the line 4—4 of Figure 3, and Figure 5 is an enlarged perspective view of a bar section of one of a plurality of sectional extensible arms for securing the device in installed position.

Figure 1:
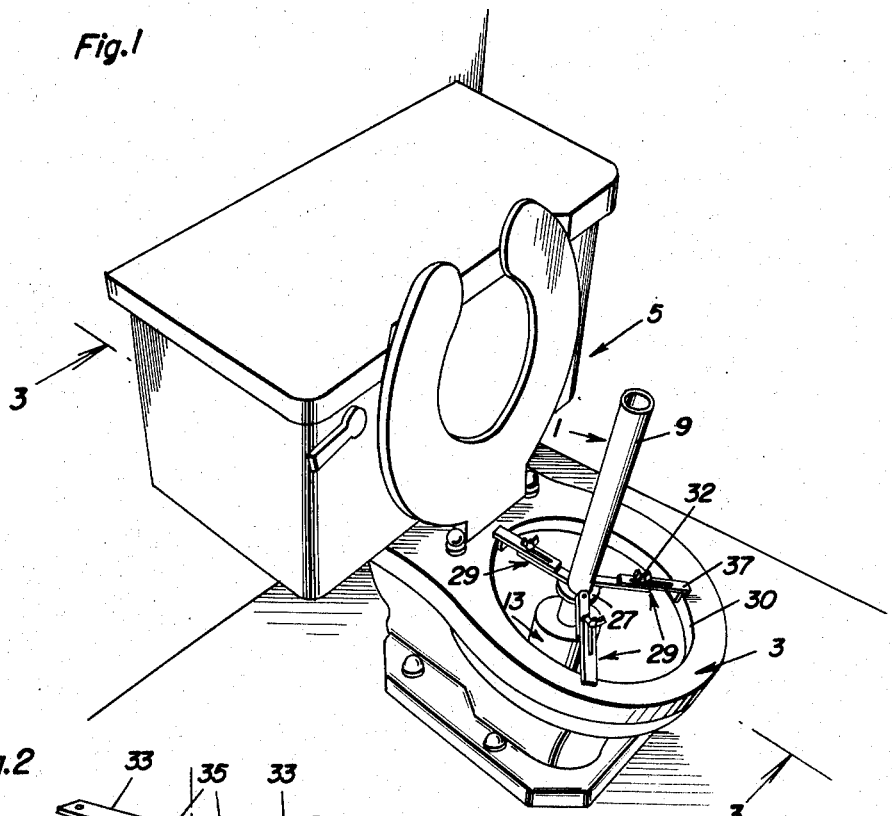
Figure 1 is a perspective view of a basement toilet having the device of this invention installed in the commode thereof.
Figure 2:
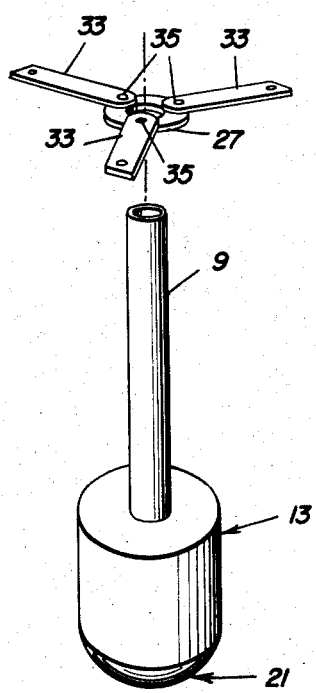
Figure 2 is an enlarged exploded view in perspective of parts of the device.

Referring by numerals to the drawings, the device of this invention, and which is designated generally by the numeral 1, has been shown therein as installed in the commode 3 of a conventional basement toilet 5, the sewage discharge of the commode 3 being shown at 7.

The device 1 comprises a standpipe 9 rising coaxially from the upper end 11 of a larger diameter, cylindrical, tubular weight 13 having an axial vertical bore 15 communicating with the lower end 17 of the standpipe 9 which is threaded into the upper end of said bore 15. The weight 13 is larger in diameter than the discharge 7, is provided with a reduced lower end 19, and is formed of heavy metal, such as lead, or cast iron.

A resilient, annular sealing gasket 21 is sleeved onto and suitably secured to the lower end 19 of the weight 13 to rest on the bottom 24 of the commode 3 over the mouth 23 of the discharge 7 and cover and seal said mouth against backflow of sewage into the commode 3, and by being held down under compression over said mouth 23 when the weight 13 and standpipe 9 are vertically aligned with said mouth.

The gasket 21, for sealing purposes is larger in diameter than the mouth 23 of the discharge 7 and is formed with a convex bottom 25 to protrude partially into the mouth 23. Preferably the gasket 21 is formed of sponge rubber to be easily compressed.

Means for securing the standpipe 9 and weight 13 in the commode 3 in upright position and vertical alignment with the mouth 23 of the discharge 7 is provided and will now be described.

A washer 27 is slidably fitted on the standpipe 9 above the weight 13. A plurality of sectional, extensible arms 29 are provided on the washer 27 to extend radially horizontally therefrom to the rim 30 of the commode 3. The arms 29 each include an inner bar section 33 terminally pivoted, as at 35, on the washer 27 for horizontal swinging, and an outer bar section 37 slidably connected to the inner bar section 33 and terminating in an outer right angled jaw end 39 for overlying and straddling the rim 30 in clamping engagement therewith. The inner and outer bar sections 33, 37 of each arm 29 are suitably slidably connected for extending the arm and locking the same in extended position by a wing nut equipped bolt 31 in the inner bar section 33 slidable in a longitudinal slot 41 in the outer bar section 37.

The use and operation of the described device will be readily understood. The standpipe 9 and weight 13 are stood upright on the bottom 24 of the commode 3 with the gasket 21 seated on said bottom 24 over the mouth 23 of the discharge 7. With the washer 27 slid on the standpipe 9 upwardly, substantially level with the rim 30, the arms 29 are swung into radial position relative to the washer 27 and extended to engage the jaws ends 39 with the rim 30 in overlying and straddling engagement thereto, and the wing nuts 32 on the bolts 31 are tightened. Thus the arms 29 are locked in dead-center rim engaging position. When the device is thus installed, the combined weight of the standpipe 9 and weight 13 will hold the gasket 21 in sealing position and backflow from the sewer, represented at 43, will rise in the standpipe 9, through the bore 15 and washer 27. In this connection, it is, of course, to be understood that the standpipe 9 rises out of and above the commode 3 a distance sufficient to prevent backflow from the sewer from overflowing out of said standpipe and the weight 13 is sufficiently heavy to more than overcome back pressure against the gasket 21 to hold said gasket 21 down, under pressure, in tight sealing position. Also, as will be understood, when the device is installed, the standpipe 9 is free to slide downwardly in the washer 27, by gravity, for gravitational action of the weight 13 so that the weight is free to compress the gasket 21. The standpipe 9 and bore 15 form a secondary water seal to prevent the escape of sewer gases out of the standpipe 9.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A device for preventing flooding of a toilet commode from backflow of sewage comprising a weight having a vertical bore and a resilient annular bottom gasket thereon and adapted to hold said gasket seated under pressure on the bottom of a toilet commode over and in sealing relation to a sewage discharge in said bottom while permitting backflow of sewage to rise through said discharge, gasket and bore, a standpipe fixed to and rising from said weight in vertical alignment with said bore for containing backflow sewage rising through said bore and preventing overflow from the standpipe into said commode, and means on said standpipe engageable with a rim of a commode to hold said weight and standpipe vertically aligned with said discharge and through which said standpipe is downwardly slidable to permit the gasket to be seated under pressure by said weight, comprising a washer slidably fitted on said standpipe, arms on said washer having right angled ends for overlying and straddling a commode rim, said arms being terminally pivoted on said washer and extensible for horizontal swinging and lengthening to adjust said right angled ends for overlying and straddling rims of commodes of different sizes with the arms radial to said washer in dead-center lock position.

References Cited in the file of this patent

UNITED STATES PATENTS

| | | |
|---|---|---|
| 1,213,743 | Carson | Jan. 23, 1917 |
| 2,327,602 | Kesteloot | Aug. 24, 1943 |